Oct. 8, 1957 N. E. GADDINI 2,808,863
FRUIT HALVING AND PITTING MACHINE
Filed June 20, 1955 6 Sheets-Sheet 3
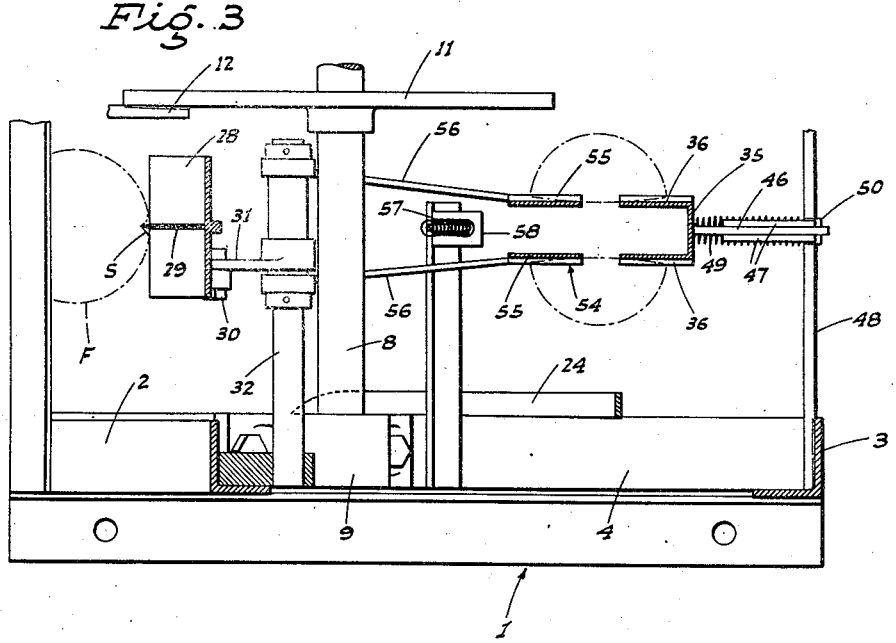
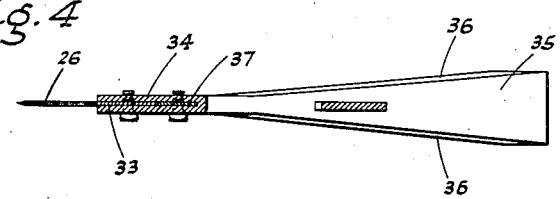
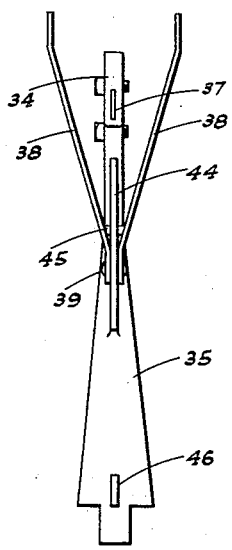
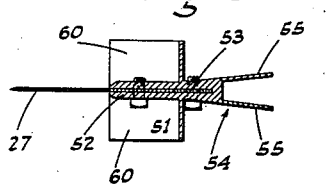
INVENTOR
N. E. Gaddini
BY
ATTORNEYS Oct. 8, 1957 N. E. GADDINI 2,808,863
FRUIT HALVING AND PITTING MACHINE
Filed June 20, 1955 6 Sheets-Sheet 4
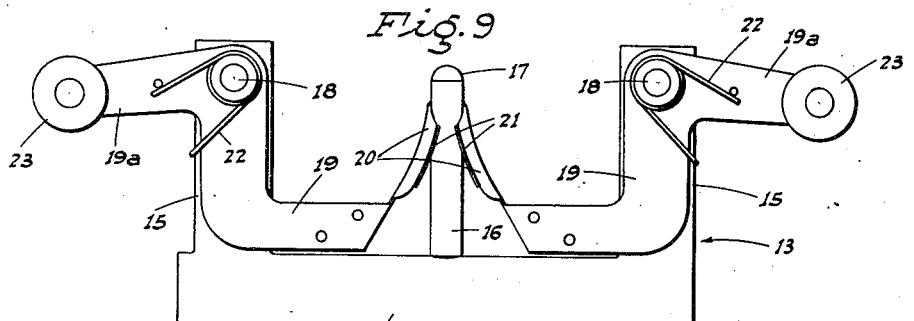
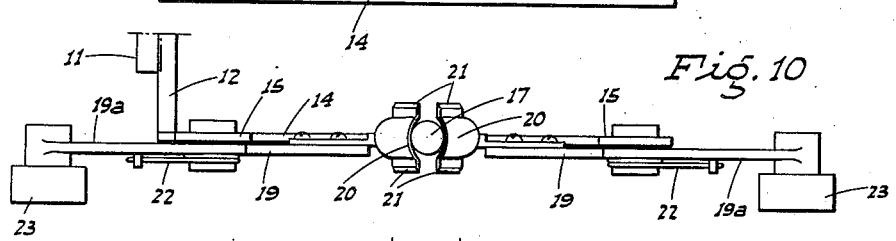
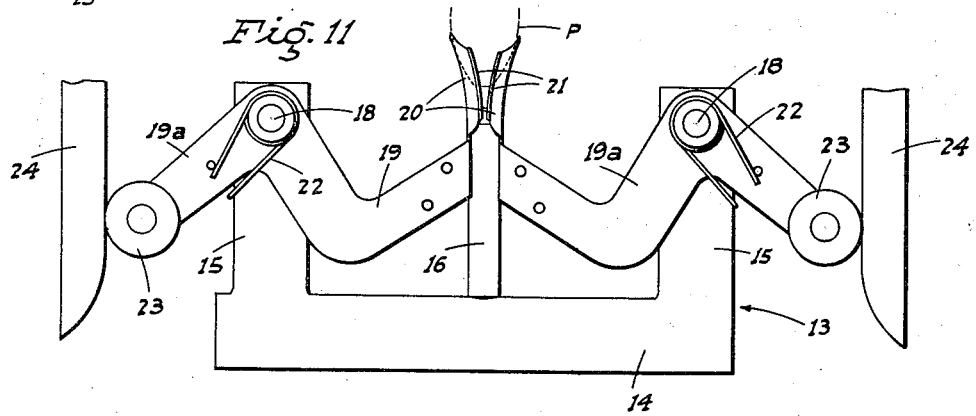
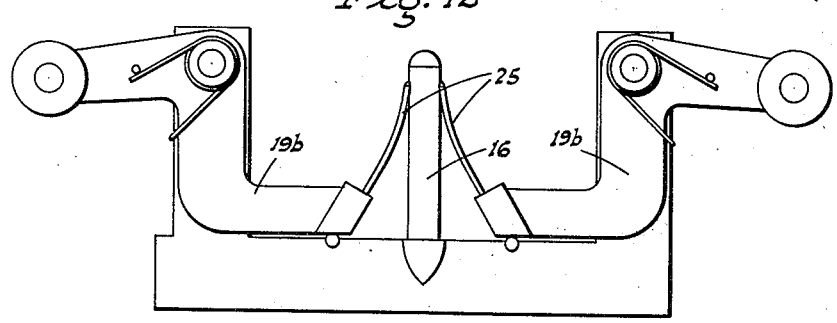
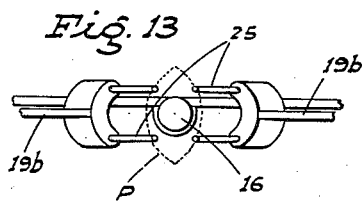
INVENTOR
*N. E. Gaddini*
BY
ATTORNEYS Oct. 8, 1957   N. E. GADDINI   2,808,863
FRUIT HALVING AND PITTING MACHINE
Filed June 20, 1955

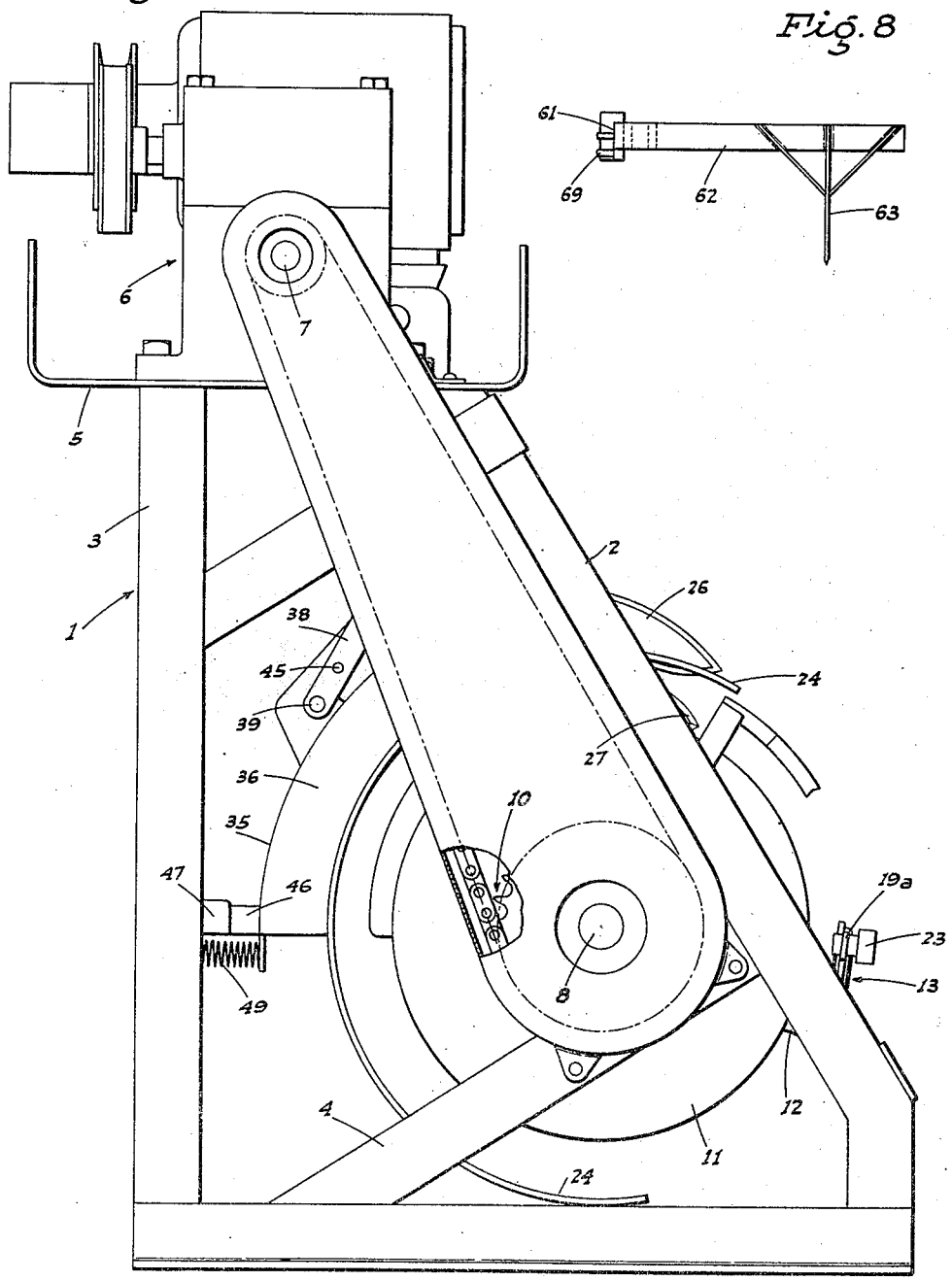

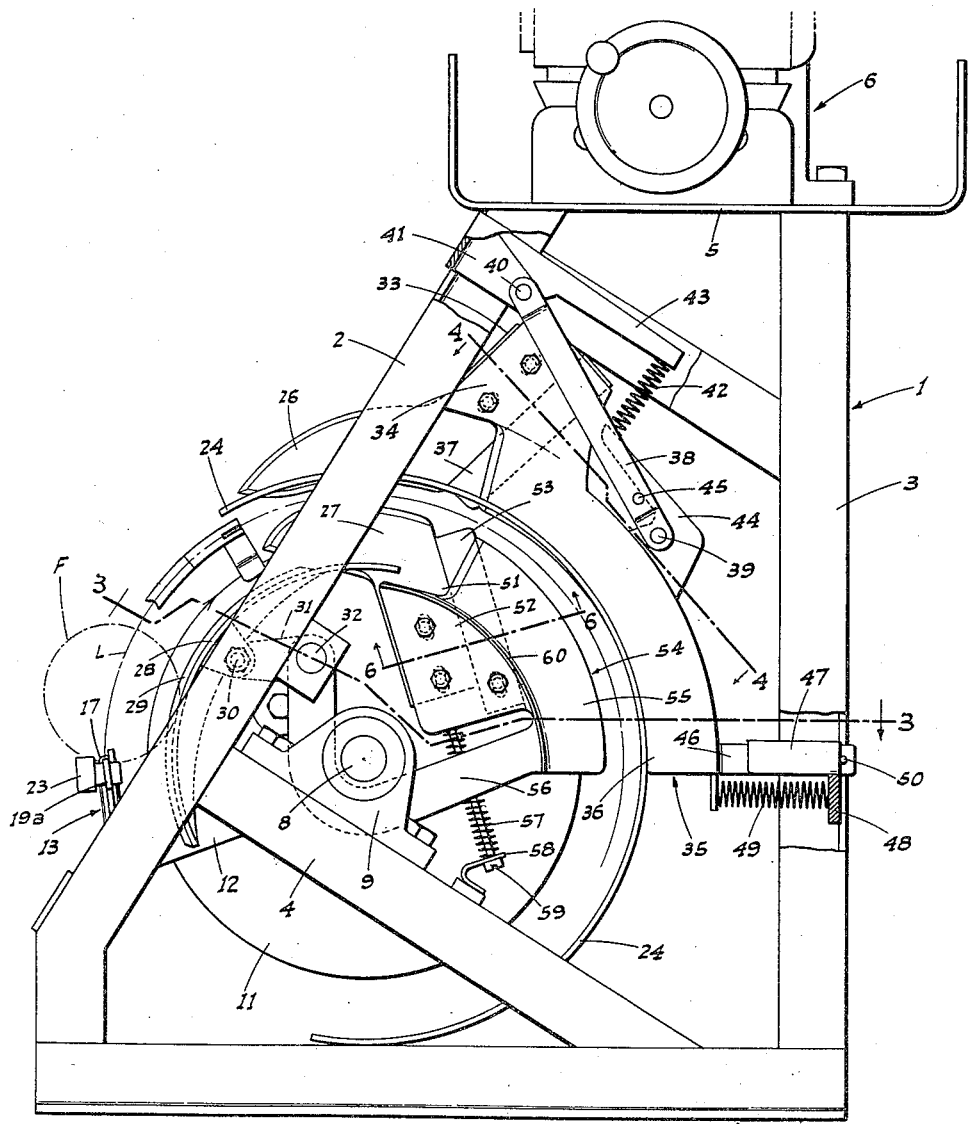

INVENTOR
N. E. Gaddini
BY
ATTORNEYS

Oct. 8, 1957   N. E. GADDINI   2,808,863
FRUIT HALVING AND PITTING MACHINE
Filed June 20, 1955   6 Sheets-Sheet 6

INVENTOR
N. E. Gaddini
BY
ATTORNEYS

United States Patent Office 2,808,863
Patented Oct. 8, 1957

2,808,863

FRUIT HALVING AND PITTING MACHINE

Norman E. Gaddini, Winters, Calif.

Application June 20, 1955, Serial No. 516,421

14 Claims. (Cl. 146—28)

This invention relates to a machine for halving and pitting freestone fruit, such as apricots and peaches; the major object being to provide a machine for the purpose which will efficiently halve the fruit, then separate the cut halves from the pits, and finally deposit said halves and pits in segregated relation to each other.

Another important object is to provide a fruit halving and pitting machine which includes opposed halving knives between which the fruit is passed, and means arranged in cooperating relation to the knives to enable the operator to dispose the fruit on the machine so that the suture thereof is properly alined with the knives.

In connection with the above object, it will be obvious that the pits will also pass between the knives, and another object of the invention is to so mount the knives that while arranged to cut through practically the entire thickness of the flesh of the fruit all about the pit regardless of the size of the fruit and its pit, said knives may separate when encountering pits of different sizes.

It is also an object of the invention to provide a fruit halving and pitting machine, as above, which includes means, functioning automatically as soon as the fruit reaches and is engaged by the knives, which will engage the pit and locate and maintain the same in the desired centralized position relative to the knives, so that said pit will not be deflected sideways while the fruit is passing through the knives.

A further object of the invention is to provide other automatically functioning means, which will operate in cooperation with the above noted pit engaging and locating means, which will also engage and hold the pit when the fruit is cut through, so that the pit cannot drop free along with the separated fruit halves and hence become mixed therewith, but which will release the pit after the halves have been separated and diverted in the machine.

An additional object of the invention is to provide a fruit halving and pitting machine which has substantial capacity, and functions smoothly and positively for the intended purpose.

Still another object of the invention is to provide a practical, reliable, and durable fruit halving and pitting machine, and one which will be exceedingly effective for the purpose for which it is designed.

In the drawings:

Fig. 1 is a side elevation of my fruit halving and pitting machine, looking at one side thereof.

Fig. 2 is a similar view of the machine, but looking at the opposite side thereof, and partly broken out and in section.

Fig. 3 is a fragmentary sectional plan of the machine, substantially on line 3—3 of Fig. 2.

Fig. 4 is a sectional plan of the upper knife and fruit-half separating unit detached, and taken on line 4—4 of Fig. 2.

Fig. 5 is an end elevation of said upper unit, detached but including the mounting arms thereof.

Fig. 6 is a sectional plan of the lower knife and fruit-half separating unit detached and taken on line 6—6 of Fig. 2.

Fig. 7 is an end elevation of said lower unit, detached.

Fig. 8 is a top plan view of the fruit penetrating and pit engaging unit, or spear unit, detached.

Fig. 9 is an enlarged front elevation of the whole fruit supporting and conveying unit detached and in its initial position.

Fig. 10 is a top plan view of the unit shown in Fig. 9.

Fig. 11 is a view similar to Fig. 9, but showing the pit locating elements advanced.

Fig. 12 is an enlarged front elevation of a fruit supporting and conveying unit, provided with a modified form of pit locating elements.

Fig. 13 is a fragmentary plan view of the unit shown in Fig. 12.

Figure 14:
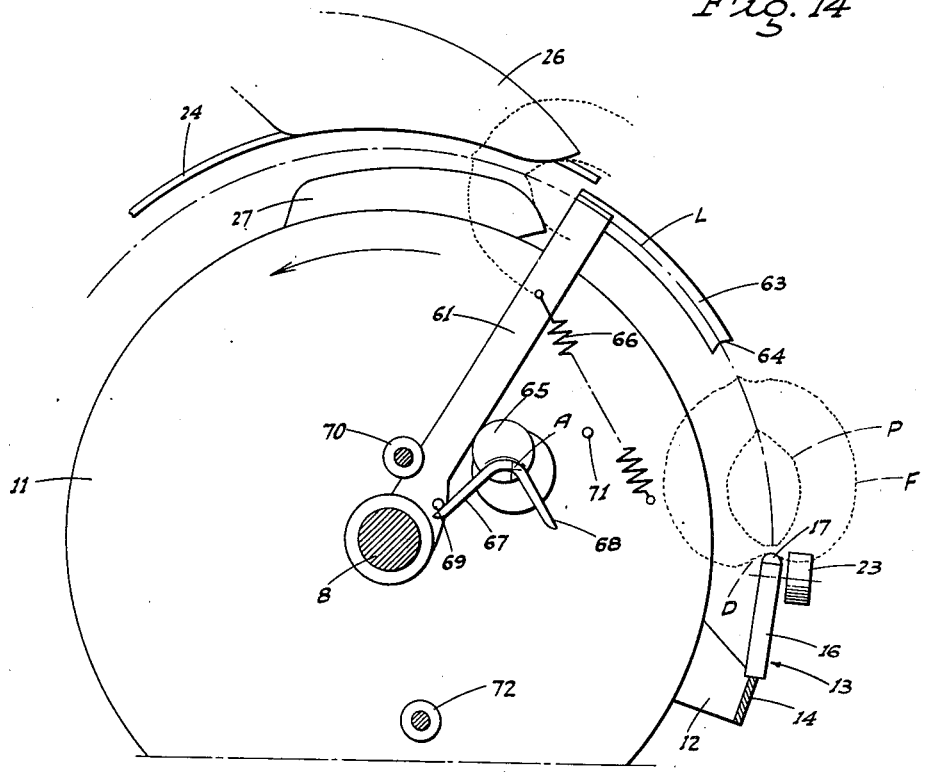
Fig. 14 is an enlarged fragmentary side diagrammatic view, showing the fruit conveying unit and the spear unit in their initial position, in connection with the halving knives, and the spear unit controlling cam.

Referring now more particularly to the drawings, and to the characters of reference marked thereon, the machine comprises a supporting frame 1 which includes transversely spaced front and rear uprights 2 and 3, respectively, and longitudinal side bars 4. The uprights support a top platform 5 on which a suitable variable-speed drive unit 6 is mounted, said unit including a transverse output shaft 7 (see Fig. 1).

A shaft 8, parallel to shaft 7, is mounted in journal boxes 9 and bars 4 and is connected to said shaft 7 in driving relation by a chain drive 10 disposed at one side of the machine.

Fixed on the shaft 8 between the side uprights of the frame and near one side of the frame is a disc 11 on which is secured a short radial arm 12 on the outer end of which a transversely extending whole fruit supporting unit is supported, said unit being indicated generally at 13.

As shown particularly in Figs. 9–11, this unit comprises a frame which includes a transverse base bar 14 having end uprights 15.

A stem 16 is secured on and upstands from bar 14 centrally between uprights 15; said stem, on its upper end, carrying a rounded head 17 adapted to seat in the depression D found in the stem end of a fruit F (such as a peach) to be halved and pitted (see Fig. 14).

Mounted in the uprights 15 at a level adjacent that of the head 17 are forwardly projecting pins 18 on which arms 19 are turnable, these arms lying in a common transverse plane parallel to and just in front of the uprights 15. The arms 19 at their lower end approach stem 16 and are well below the head 17, and mounted on and upstanding from such ends are concave, gouge-shaped, upstanding coring members 20 which, as to the length, are curved concentric with the pins 18.

In their initial or normal position the members, at their upper end, contact the stem 16 below its upper end, as shown in Fig. 9. The members 20 are of relatively thin metal, sharpened across their upper end, and may include sharp cutting blades 21 projecting from their side edges, as shown.

With this arrangement, it will be seen that if the arms 19 are rotated on the pins 18 in a direction to raise the members 20 above the head 17, said elements—at their upper end—will gradually spread or diverge from each other, as shown in Fig. 11. Said members will thus penetrate the flesh of the supported fruit F, and will engage and locate the pit P thereof on opposite sides, as indicated, and prevent lateral deflection thereof.

The arms 19 are yieldably held with the members 20 in their lowered position by springs 22, and in order to turn the arms on the pins, to raise the members 20 against the resistance of the springs, the arms, at their upper ends, are provided with extensions 19a projecting laterally out, and carrying rollers 23 on their outer end. These rollers are initially clear of—but are adapted to engage—cam strips 24 mounted on the machine concentric with the shaft 8, with their terminations at predetermined points relative to the initial or fruit loading position of the supporting unit 13, as will hereinafter appear.

Instead of the gouge members 20, a modified arrangement may be used, as shown in Figs. 12 and 13. In this modified form, pairs of spaced resilient pins 25 project upwardly from the lower end of arms 19b in symmetrical spaced relation to stem 16 and curved in the same manner as member 20 so that when lifted or advanced they will pierce the fruit and pass on opposite sides of the pit in engagement therewith, as indicated in Fig. 13.

Disposed some distance beyond the loading station of unit 13, relative to the direction of rotation of the shaft 8 and unit 13, are opposed upper and lower halving knives 26 and 27, respectively, disposed in a transverse plane coincident with that of the stem 16. The facing curved edges of the knives substantially follow, and are spaced evenly on, opposite sides of the circular line L of movement of the fruit supporting head 17, and of the fruit engaged by said head. The normal spacing of the edges of the knives is less than the width of a pit P, and said edges at the leading or entry end flare to a spacing greater than the width of a pit. Both the upper and lower edges of such knife are sharpened and diverge from their leading end, as shown.

Between the loading station of unit 13 and the knives, a fruit seated on head 17 (the stem 16 of which forms a pusher member) rests against an arcuate guide plate 28 concentric with line L so that as the fruit is advanced toward the knives by rotation of unit 13, it will follow and cannot deviate from the desired curved path of movement.

This plate is formed with a longitudinal shallow but sharp rib 29 projecting from its outer face and which is disposed in the vertical plane of the knives, and which is also the plane of stem 16. This rib forms a locating means for the suture S of the fruit (see Fig. 3), so that a fruit when placed on the head 17 by the operator may be properly located relative to the knives in order that it will be halved along the line of suture, as is desired.

The plate is removably mounted in place, so that plates having a different radius of curvature may be used for fruits of different diameter, by means of a bolted connection 30 with an arm 31 projecting from a transverse shaft 32 secured in connection with the frame upright 2 furthest from the disc 11 and terminating short of said disc, as shown in Fig. 3; this shaft being located between shaft 8 and the front of the frame and above shaft 8, as shown in Fig. 2.

The upper knife 26 includes a rear-end upstanding shank 33 clamped, for longitudinal adjustment to alter the spacing between the lower edge of the knife and the line L, in a retainer 34.

A wedge-shaped fruit-half separating member 35 projects rearwardly and downwardly from the retainer and follows the curvature of line L in gradually diverging relation thereto. This member 35 includes laterally diverging side plates 36 connected at their outer edges but free along their inner edges, as shown in Fig. 3.

The retainer 34, immediately back of the shank 33, also independently adjustably supports the shank of a secondary narrow knife 37 whose cutting edge at the rear is disposed substantially the same distance from line L as the lower edge of knife 26 just back of its flaring forward end.

The knife 26, retainer 34, and member 35 form a rigid unit, which is mounted on or supported from the frame for upward yielding of the knife and independent rearward movement of member 35 at its lower end, by the following means:

Transversely spaced links 38 are pivoted at their rear end on member 35 intermediate its ends, as at 39, and extend thence forwardly in straddling relation to retainer 34 to a pivotal connection 40 with a bracket 41 mounted on the frame 1.

A compression spring 42 extends between a frame-mounted arm 43 overhanging the retainer 34 and another arm 44 on the member 35 between the links 38; a stop pin 45 mounted on the links and extending under the arm 44 limiting the expanding action of the spring and the lowering of the knife.

At its rear end, which may be substantially level with shaft 8, member 35 is provided with a rearwardly projecting tongue 46 slidably engaged between guides 47 mounted on a cross bar 48 extending between the frame uprights 3. A compression spring 49 between bar 48 and the member 35 yieldably resists rearward movement of said member; a stop 50 limiting the expanding movement of the spring. It will thus be seen that the knife and wedge unit may swing upwardly about link pivot 39 as an axis, or swing rearwardly about link pivot 40 as an axis.

The lower knife 27 is formed with a depending shank 51 clamped for longitudinal adjustment to alter the spacing between the upper edge of said knife and the line L, in a retainer 52. A secondary knife 53, corresponding and directly opposed to knife 37, is mounted in the retainer 52 for longitudinal adjustment independently of knife 27. The cutting edge of knife 53 at its rear end is disposed substantially the same distance from line L as the upper edge of knife 27 just back of its flaring forward end.

A wedge-shaped fruit-half separating member 54 projects rearwardly and downwardly from the retainer 52, with its upper or outer edge below and generally following the curvature of line L in gradually diverging relation thereto. Member 54 includes laterally diverging side plates 55, whose angle and extent of divergence is the same as that of the side plates 36 of the upper wedge member, as shown in Fig. 3. The member 54 terminates at its lower end at the same level as the lower end of member 35, and is open at its upper or rear end in facing relation to the open side of wedge member 35, as shown.

The lower end of wedge member 54 is rigid with side hanger arms 56 which extend under the shaft 8 and then up to a swinging connection with shaft 32, as clearly shown in Fig. 2. A compression spring 57 extends between the lower end of retainer 52 and a frame-mounted bracket 58 below; a stop element 59 between the retainer and bracket limiting the expanding movement of the spring.

Side flanges or ledges 60, curved substantially concentric with shaft 8, project laterally out from the wedge plates 55 at their inner end; said flanges also extending along the retainer 52.

The side plates of both wedge members have their inception at the rear end of the corresponding secondary knives, being beveled at such inception, which is substantially radial relative to shaft 8, so that there is no abrupt break between the faces of the knives and those of the wedge plates.

Turnably mounted on shaft 8, on the side of disc 11 opposite the knives above described, is an arm 61 which, on its outer end, supports a transverse bar 62 disposed in the plane of line L and arranged to project between the knives. This bar mounts a forwardly projecting spear 63 curved lengthwise concentric with line L, and disposed in the vertical transverse plane of the knives between the same. The radial width of the spear is but slightly less than the radial space between the secondary knives 37 and 53, or that between the halving knives 26 and 27 adjacent their forward end so that the spear may move through a curved path without scraping the knives. The forward end of the spear is sharpened and is preferably concaved or V-shaped, as shown at 64, and forms a center cutter as well as a pit engaging member.

Figure 16:
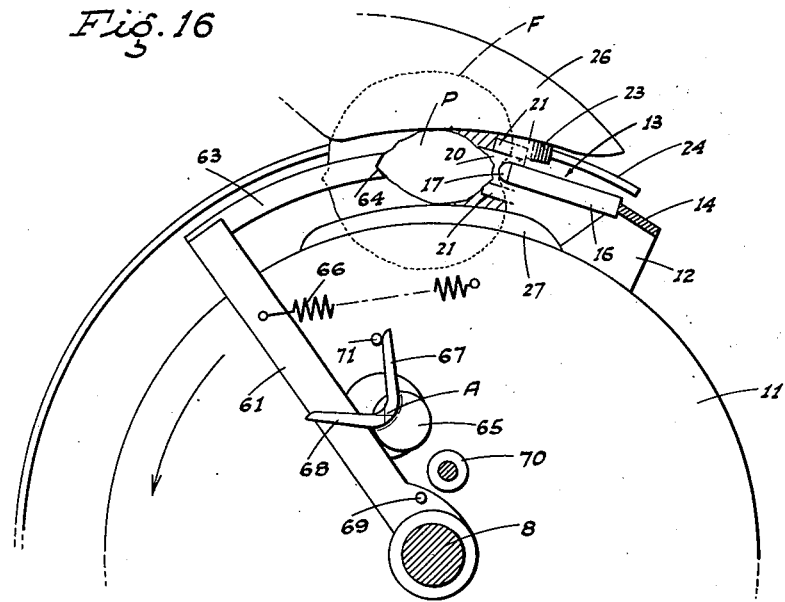
Fig. 16 is a similar view, but showing the holding cam of the spear unit released and the spear unit moved back to pierce the fruit of the advancing flesh and engage the pit thereof.
Figure 17:
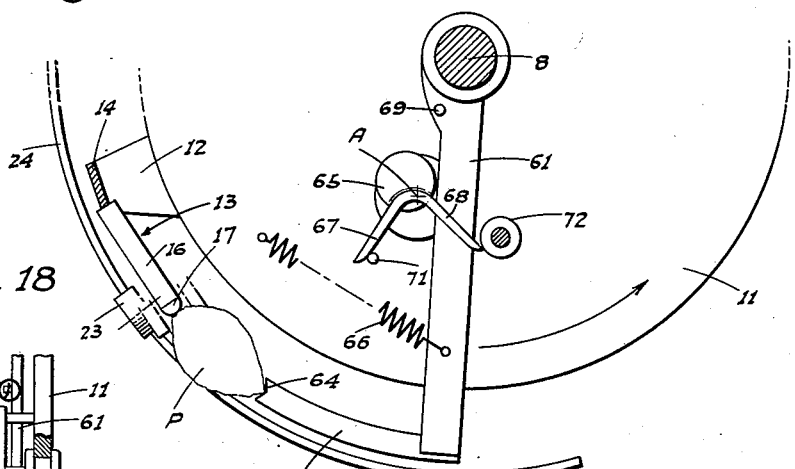
Fig. 17 is a similar view, taken adjacent the point of release of the pit and subsequent to the dropping of the cut fruit halves away from the pit.
Figure 18:
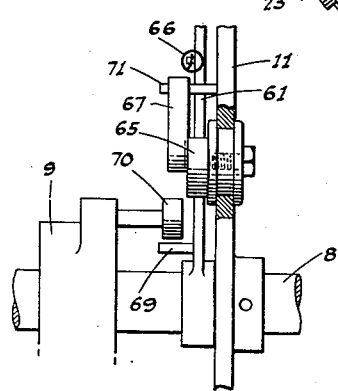
Fig. 18 is a fragmentary end view, partly broken away and in section, of the rotary disc and the mounting arm of the spear unit, together with the arm releasing cam and one of the actuating elements thereof.

The arm 61, intermediate its ends, is engaged by an eccentric rotary cam 65 turnably mounted in the disc 11, as shown in Fig. 18. This cam is arranged relative to its axis A of rotation in the disc so that in one position of the cam the arm 61 will be held so that the forward end of the spear is a greater distance from the fruit supporting head than the diameter of any fruit, as shown in Fig. 14; while in the opposite position of the cam the arm may swing forward to dispose the forward end of the spear a distance from the head 17 not greater than the length of a pit P, as shown in Figs. 16 and 17.

A spring 66 between the arm 61 and disc 11 tends to pull the arm forwardly and also acts to cause the cam to turn from one position to the other after said cam has been initially rotated a certain distance through a portion of its total turn, upon rotation of the disc 11, by means which will now be described.

Rigid with the cam, but clear of the arm 61, are legs 67 and 68, disposed substantially at right angles to each other and generally radially of the axis of rotation of the cam. Both legs depend from such axis, or away from the spear 63, when the arm 61 is in its rearward or restrained position, and the point of engagement of the cam 65 is then further from the axis of shaft 8 than the axis A, as shown in Fig. 14. This causes the spring 66 to exert a rotative action on the cam, such action being limited by the engagement of the leg 67 with a stop 69 on arm 61.

A frame-mounted stop 70 above shaft 8 is positioned in the path of movement of leg 67, as the disc 11 rotates, so that the cam is rotated about axis A to dispose the point of engagement of the cam with the arm 61 closer to shaft 8 than the axis A.

As soon as this occurs the pressure of spring 66 acts to rotate the cam still further, or until the leg 67 engages a stop 71 on the disc 11, as shown in Fig. 16. The leg 68, being shorter, moves past the stop 71 without interference. When the cam is thus rotated the legs generally face in the direction of the spear, and the leg 68 is disposed in the path of another frame-mounted stop 72 disposed below the shaft 8. With continued rotation of the disc 11, therefore, the leg 68 is engaged by stop 72, as shown in Fig. 17, which acts to again turn the cam, retracting arm 67, and finally causing the cam to be returned to its initial position, with the leg 67 engaged with stop 69.

In operation, with disc 11 and unit 13 connected thereto constantly rotating at a suitable speed, a fruit, such as a peach, is placed on head 17 by the operator as such head moves upwardly toward the knives; the fruit being manipulated by the operator so that its suture engages the flange 29 of guide plate 28 on which the fruit rests. At this time the members 20 are retracted, the control rollers 23 being free of the cam strip 24, and the spear 63 is clear of the fruit, as shown in Fig. 14.

Figure 15:
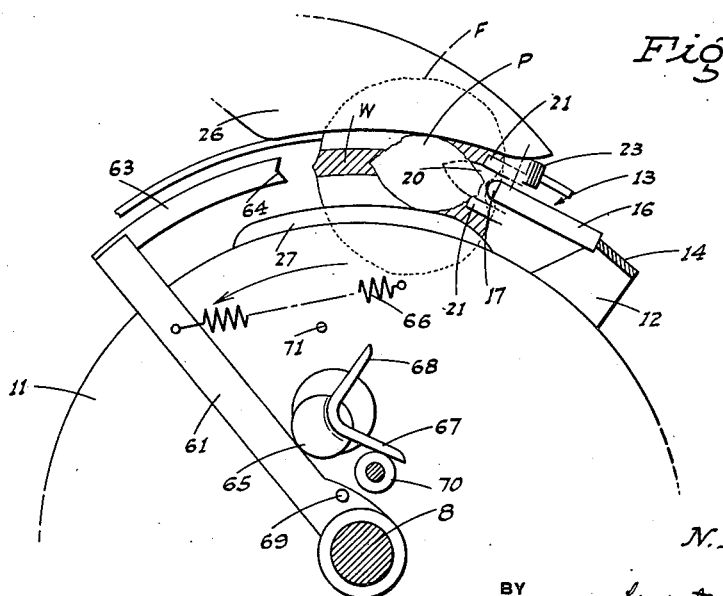
Fig. 15 is a similar view, showing the fruit conveying unit advanced so as to halve the fruit and dispose the pit between the knives, and just as the pit locating elements have been advanced but before the spear unit has changed its position.

With further rotation of the disc 11 and fruit supporting unit, the fruit passes between the knives 26 and 27 and is first cut from opposite sides at its leading or flower end before the pit engages the blades, as indicated in dotted lines at the top of Fig. 14, leaving a narrow uncut web of flesh between the leading end of the fruit and the adjacent end of the pit, as shown at W in Fig. 15.

As soon as the pit P engages the knives it causes said knives to separate, and sets up a slight resistance to the advance of the fruit. At this time the rollers 23 engage the cam strips 24, causing the members 20 and their blades 21 to be advanced into the fruit to cut through the flesh between the stem end of the fruit and the adjacent end of pit P, and engage and locate the pit on opposite sides thereof, as shown in Fig. 15.

The fixed upper actuating stop 70 for the cam 65, which controls the movement of arm 61 and spear 63, is so positioned that said arm is released just after the pit locating members have advanced, as above described. The spear then moves through and severs the web, and its V'd end 64 engages the adjacent end of the pit, as shown in Fig. 16. The fruit continues to advance between the halving knives, moving as a unit with the spear and supporting unit 13, until the pit moves beyond the rear end of the knives, allowing said knives to again approach each other. As soon as this occurs, the secondary knives 37 and 53 come into play, cutting through the thin webs of fruit left uncut by the initial action of the knives 26 and 27 and the blades 21.

The halves of the fruit are thus entirely severed from each other from end to end and are engaged by the wedge members 35 and 54 upon further rotation of the disc 11 and attached parts. As the fruit halves pass down the wedge members they separate laterally from each other and are pulled away from the pit P; the latter riding in the open space between the side plates of the wedge members. The cut halves then drop clear of the wedge members and are received in a suitable catch receptacle or conveyor (not shown) below said wedge members.

The lateral flanges 60 on the lower wedge member 54 support the fruit halves after they are released from the pit, and guide such halves to the catch receptacle.

During this time however, and until the fruit supporting and advancing unit has passed some distance beyond the wedge members, the spear 63 and head 17 still hold the pit P therebetween, as shown in Fig. 17, so that the pit is not discharged and mixed with the peach halves. The lower fixed stop 72 for actuating the cam 65 in a direction to release the arm 61 and spear 63 is therefore located at such a point on the machine that such release is effected approximately directly below the shaft 8, or thereabouts.

As soon as such release is effected, the pit drops clear and the locating members 20 may be retracted (by a termination of the cam strips 24, as shown) so that the fruit supporting unit 13 is restored to its initial condition before said unit reaches the loading station.

It may be here noted that while I have shown a single unit 13 and cooperating spear unit, a plurality of such cooperating units may be mounted on the one disc 11; the one pair of cam strips 24 and stops 70 and 72 serving to control the actuation of the moving parts of all such units.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A device for engaging a fruit between the opposed halving knives of a fruit halving machine, said fruit hav- 1. ing a pit and a recess at its stem end, the device including a support having a portion movable between the knives, a stem projecting from said support portion to engage in said recess and located in the plane of the knives and extending lengthwise of the knives in position to pass therebetween without interference when the knives are engaged with the fruit, and means cooperating with the support to pierce the fruit at its stem end and engage the pit in locating and centralizing relation upon the fruit being engaged by the knives.

2. A device for engaging a fruit between the opposed halving knives of a fruit halving machine, said fruit having a pit therein and a recess at its stem end, the device including a support having a portion movable between the knives, an elongated stem projecting from said support portion to engage in said recess in fruit pushing relation and located in the plane of the knives and extending lengthwise thereof in position to pass therebetween, normally retracted elements on opposite sides of the stem terminating at their outer end below the outer end of the stem, and means connected to and acting on the elements to advance the same upon the fruit being engaged by the knives so that the elements then penetrate the fruit at its stem end and engage the pit on opposite sides in centralizing relation.

3. A device, as in claim 2, in which the elements are gouge-shaped in section.

4. A device, as in claim 3, with cutting flanges, extending as to their width, parallel to the knives, and projecting from the side edges of the elements.

5. A device, as in claim 2, in which the elements are spaced pairs of pins.

6. A device, as in claim 2, in which said means includes arms pivoted on the support in laterally spaced relation to the stem at a level approximately the same as that of the outer end of the stem; the elements being curved concentric with the arm pivots and of a length such that when retracted, their outer ends lie adjacent the stem.

7. A fruit halving and pitting machine comprising a frame, a driven shaft mounted on the frame, a disc fixed on the shaft, a pair of opposed halving knives disposed to one side of the disc, a fruit engaging and advancing member fixed with the disc to push a fruit between and past the knives, means cooperating with the advancing means to penetrate the fruit and engage the rear portion of the pit thereof in centralized relation upon the fruit being engaged by the knives with rotation of the disc, a spear disposed to penetrate the forward end of the fruit and engage the forward end of the pit, an arm turnable on the shaft and on which the spear is mounted, a spring between the arm and disc tending to move the arm and spear to a pit engaging position, means on the disc engaging the arm to normally hold the same rigid with the disc in the direction of rotation thereof and maintaining the spear clear of and in front of the fruit, and means functioning upon rotation of the disc to release the arm holding means subsequent to the engagement of the pit centralizing means with the fruit.

8. A machine, as in claim 7, with means functioning upon further rotation of the disc a predetermined amount and including the arm holding means in part to withdraw the spear from its pit engaging position and restore said arm to its normal position against the resistance of the spring.

9. A machine, as in claim 7, in which the arm holding means comprises an eccentric cam turnably mounted on the disc behind the arm and which in one position holds the arm against movement by the spring and in another position allows the spring to function, means between the cam and frame to rotate the cam from said one position to the other position upon the disc reaching a predetermined point in its rotation, and other means between the cam and frame to rotate the cam from said other position to the one position upon the disc reaching a subsequent predetermined point in its rotation.

10. In a halving machine for freestone fruit having a pit, a pair of opposed halving knives yieldable to and from each other, means to advance a fruit between the knives with the pit in engagement with the knives whereby said knives are then separated, a center cutter positioned to penetrate the fruit at its leading end to cut the portion of the flesh left uncut by the separated knives, and secondary knives mounted as a unit with the first named knives and disposed relative thereto in position to cut the flesh of the fruit at its rear end after the pit has been advanced beyond the first named knives.

11. In a halving machine for freestone fruit, a pair of opposed halving knives yieldable to and from each other, means to advance a fruit between the knives with the pit in engagement with the knives whereby said knives are then separated, secondary knives mounted as a unit with the first named knives in position to cut the flesh of the fruit at its rear end after the pit has been advanced beyond the first named knives, a support for each of the first named knives and the corresponding secondary knife, means mounting the first named knives in their supports for adjustment to and from each other, and means mounting the secondary knives in their supports for adjustment to and from each other independently of the first named knives.

12. In a halving machine for a fruit having a pit, a fruit halving unit, a fruit engaging and supporting unit initially spaced from the halving unit, means mounting said units for relative approaching motion whereby a fruit on said engaging and supporting unit is passed through said halving unit; said fruit engaging and supporting unit including a member positioned to seat in the stem-end recess of the fruit, elements relatively movable with said member to penetrate the halves of the fruit and hold the pit against lateral deflection, means mounted in cooperative relation with the halving unit to separate the fruit halves from the pit beyond said halving unit and while said elements remain in holding relation to such pit, means mounting the elements in connection with the member so that said elements initially occupy a retracted position relative to said member, means to advance said elements into fruit-half penetrating position upon the fruit being contacted by said halving unit, and means to retract said elements only after separation of the fruit halves from the pit.

13. A device for engaging a fruit between the opposed halving knives of a fruit halving machine, said fruit having a pit and a recess at its stem end, the device including a support having a portion movable between the knives, a stem projecting from said support portion to engage in said recess and located in the plane of the knives and extending lengthwise of the knives in position to pass therebetween without interference when the knives are engaged with the fruit, normally retracted elements mounted on the support and cooperating with the stem in position when advanced to pierce the fruit at its stem end and engage the pit in locating and centralized relation, and means acting on the elements to so advance the same upon advance of the stem sufficiently to engage the fruit with the knives.

14. A device, as in claim 2, in which said means includes arms pivoted on the support in laterally spaced relation to the stem at a level approximately the same as that of the outer end of the stem; the elements being curved concentric with the arm pivots and of a length such that when retracted, their outer ends lie adjacent the stem, the arms including extensions projecting laterally out from the arm pivots, cams secured on the machine at the sides of the path of movement of the support, and cam engaging rollers on the outer ends of the extensions in position to engage the cams upon the fruit being engaged with the knives; the cams when engaging the rollers swinging the extensions in a direction to advance the elements on the stem while the stem is advancing.

References Cited in the file of this patent

UNITED STATES PATENTS

| | | |
|---|---|---|
| 569,838 | Rehm | Oct. 20, 1896 |
| 1,292,261 | Clifford | Jan. 21, 1919 |
| 1,357,004 | Robbins | Oct. 26, 1920 |
| 1,365,166 | Garman | Jan. 11, 1921 |
| 1,407,524 | Fourchy | Feb. 21, 1922 |
| 2,301,979 | Smilie | Nov. 17, 1942 |
| 2,474,492 | Perrelli et al. | June 28, 1949 |
| 2,531,927 | Waters | Nov. 28, 1950 |
| 2,629,417 | Harrer | Feb. 24, 1953 |